June 19, 1928.  J. P. JOHNSON  1,674,205
ARM REST
Filed Oct. 28, 1926
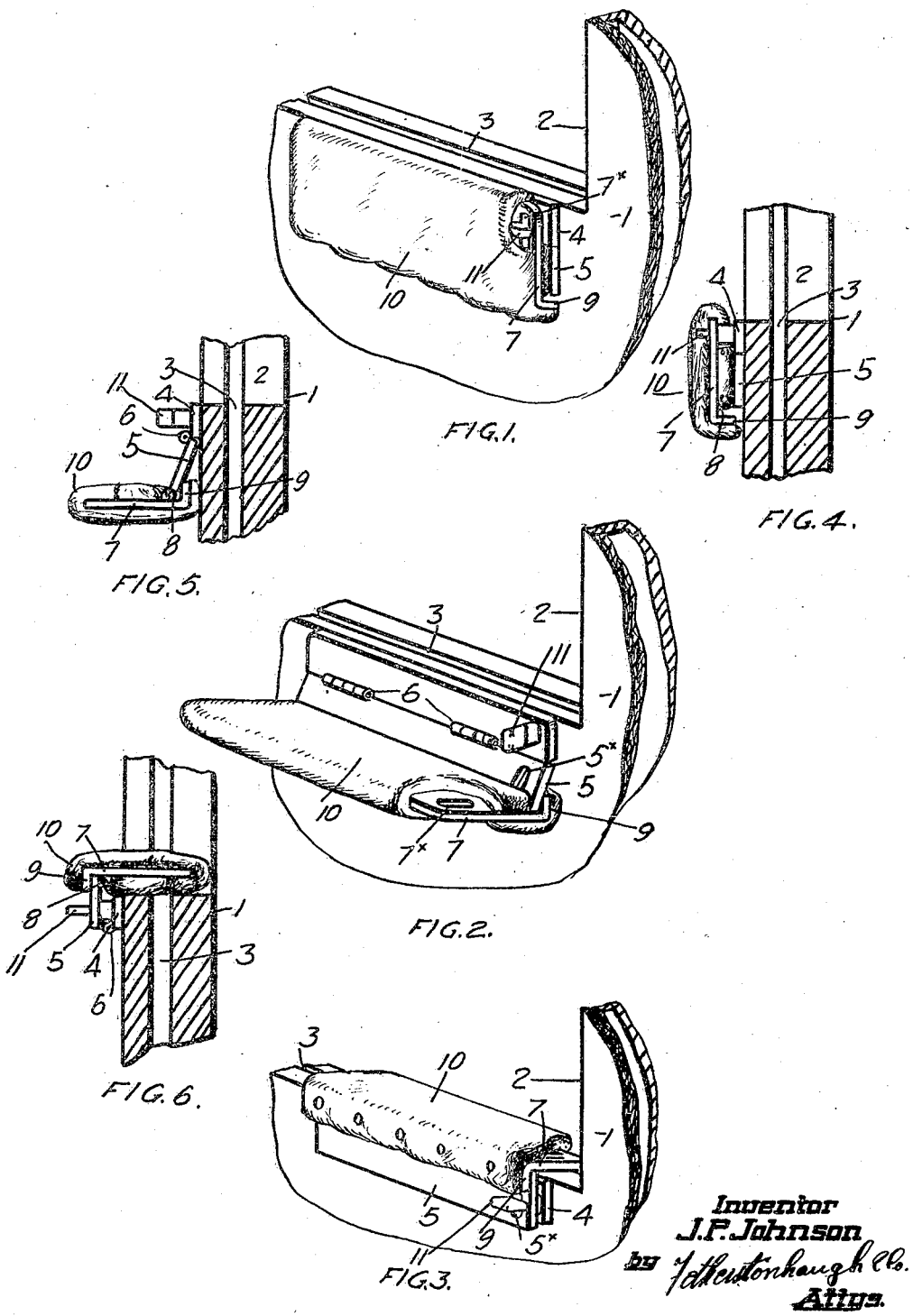
Inventor
J. P. Johnson
by Fetherstonhaugh & Co.
Attys.

Patented June 19, 1928.

1,674,205

UNITED STATES PATENT OFFICE.

JAMES PIERSON JOHNSON, OF TORONTO, ONTARIO, CANADA.

ARM REST.

Application filed October 28, 1926. Serial No. 144,832.

My invention relates to improvements in arm rests, and the object of the invention is to devise an arm rest which is particularly adaptable for use in automobiles, whereby the arm may be supported either in a comfortable position while grasping the steering wheel and when the window of the automobile is closed or on the upper edge of the window when the window is open, and which at the same time may be compactly held when not in use against the inner face of the automobile wall, and it consists essentially of the arrangement and construction of parts as hereinafter more particularly explained.

Fig. 1 is a perspective view showing a fragmentary portion of a wall of an automobile showing a portion of the window open and my device applied thereto in the folded position it assumes when not in use.

Fig. 2 is a similar view to Figure 1 showing my device in an inwardly extending position to support the arm which may be used when the window is in the closed position.

Fig. 3 is a similar view to Figures 1 and 2 showing my device in the position it assumes so as to support the arm on the lower edge of the window opening when the window is in the open position.

Fig. 4 is a sectional view through Figure 1.

Fig. 5 is a sectional view through Figure 2.

Fig. 6 is a sectional view through Figure 3.

In the drawing like characters of reference indicate corresponding parts in each figure.

1 indicates a fragmentary portion of an automobile wall in which is formed a window opening 2 having in its edge the window slot 3. 4 is a stationary plate which is secured to the inner face of the wall 1 adjacent the edge of the window opening. 5 is an intermediate plate member hingedly connected to the stationary plate as indicated at 6. 7 is a rest plate forming the body of the arm rest and hingedly connected to the intermediate plate member 5 at 8. The rest plate 7 is provided at its inner edge with a portion 9 which is upturned when the plate is in the position extending inwardly from the wall of the automobile as indicated in Figure 2, the upper edge of the portion 9 engaging the intermediate plate 5 so as to form a stop and hold the rest plate 7 in the horizontal position extending outwardly at right angles to the wall 1. The intermediate plate 5 is provided with a slot $5^x$ and a rest plate 7 with a slot $7^x$. The rest plate 7 is provided with suitable upholstering extending entirely over the same with the exception of that portion in which the slot $7^x$ is contained, such upholstering being designated by the numeral 10.

It will also be noted that the upholstering 10 extends around the outer face of the upturned portion 9 so that when the arm rest is in the position shown in Figure 2 such portion bears against the wall 1 and prevents any danger of marring or wearing the fabric forming the lining of the automobile.

11 is a turn button which may extend either through the slot $5^x$ or the slot $7^x$.

When not in use the device is in the position shown in Figure 1, the turn button 11 extending through the slot $7^x$ so as to secure the upholstered rest plate 7 in a vertical position snugly against the wall of the automobile in such a position that it will not inconvenience the occupant of the automobile.

When it is desired to use the device as an arm rest and particularly when the window of the automobile is closed the button 11 is turned so as to release the rest plate 7 which then drops to a horizontal position or the position shown in Figure 2 and thereby forming a comfortable support for the arm of the driver or other occupants of the automobile.

Particularly in summer weather the occupant of an automobile often rests his arm on the upper edge of the window opening and when held in this position for a considerable length of time discomfort is experienced owing to the hard edge or to the window not being fully withdrawn down into the slot 3.

In order to support the arm in this position the intermediate and rest plates 5 and 7 respectively are swung upward, the intermediate plate 5 assuming a position parallel with the plate 4, the turn button 9 extending through the slot $5^x$ so as to thereby lock the plate 5 in position. The rest plate 7 then extends over the upper edge of the window opening so as to bear thereon as clearly shown in Figures 3 and 6 so as to form a comfortable support for the arm of the occupant of the automobile.

From this description it will be seen that I have devised a very simple device which is simple to manufacture, easily installed and readily adjusted to assume the desired position, and which may be compactly held when not in use so as to be entirely out of the way of the occupant of the automobile.

What I claim as my invention is,—

An arm rest comprising an arm supporting member, a vertical main support, means for permitting one face of the arm supporting member to lie normally parallel and closely adjacent the face of the main support and also adapted to permit the arm supporting member to assume a position either extending horizontally over the top of the main support or a position extending horizontally from the main support positioned below the top of such main support.

JAMES PIERSON JOHNSON.